(12) United States Patent
Yueh et al.

(10) Patent No.: US 8,065,273 B2
(45) Date of Patent: Nov. 22, 2011

(54) AUTOMATED PRIORITY RESTORES

(75) Inventors: Jedidiah Yueh, Irvine, CA (US); Clint L McVey, Winter Park, FL (US); Thomas B Bolt, San Diego, CA (US); Scott Auchmoody, Irvine, CA (US); Eric Olsen, Lake Forest, CA (US); William Crosby, Santa Ana, CA (US); Scott Ogata, Lake Forest, CA (US); Jennifer Starling, Lake Forest, CA (US); Robert Ramos, Mission Viejo, CA (US)

(73) Assignee: EMC Corporation, Hopkinton, MA (US)

( * ) Notice: Subject to any disclaimer, the term of this patent is extended or adjusted under 35 U.S.C. 154(b) by 290 days.

(21) Appl. No.: 11/746,399

(22) Filed: May 9, 2007

(65) Prior Publication Data

US 2007/0294320 A1  Dec. 20, 2007

Related U.S. Application Data

(60) Provisional application No. 60/746,940, filed on May 10, 2006.

(51) Int. Cl.
*G06F 17/00* (2006.01)
*G06F 7/00* (2006.01)
(52) U.S. Cl. ...................................................... 707/645
(58) Field of Classification Search .................. None
See application file for complete search history.

(56) References Cited

U.S. PATENT DOCUMENTS

| | | | |
|---|---|---|---|
| 5,542,064 A * | 7/1996 | Tanaka et al. ................. | 711/114 |
| 5,642,505 A * | 6/1997 | Fushimi ........................ | 707/204 |
| 5,764,972 A | 6/1998 | Crouse et al. | |
| 6,212,512 B1 | 4/2001 | Barney et al. | |
| 6,275,953 B1 * | 8/2001 | Vahalia et al. ................... | 714/11 |
| 6,732,293 B1 * | 5/2004 | Schneider ........................ | 714/15 |
| 6,795,966 B1 | 9/2004 | Lim et al. | |
| 6,865,655 B1 | 3/2005 | Andersen | |
| 7,096,316 B1 | 8/2006 | Karr et al. | |
| 7,149,858 B1 | 12/2006 | Kiselev | |

(Continued)

FOREIGN PATENT DOCUMENTS

CN  200780009902  5/2011

(Continued)

OTHER PUBLICATIONS

U.S. Appl. No. 11/968,040, filed Dec. 31, 2007, Jedidiah Yueh.

(Continued)

*Primary Examiner* — Sathyanarayan Pannala

(74) *Attorney, Agent, or Firm* — Workman Nydegger

(57) ABSTRACT

A priority restore agent in a data storage system generates a priority restore data set for a client computer system or device by identifying a set of active data sets and/or a set of key data sets within client system data generated by the client computer system. The priority restore agent looks at or processes file system attributes for the client system data and compares these attributes with predefined restore parameters. The restore parameters may indicate that any file that has been accessed, modified, or created within a particular period of time be included in the priority restore data set. The key data sets may be identified in a set of automated restore rules. A data protection application within the data storage system can restore data in the priority restore data set onto the client computer system after a disaster or system crash.

19 Claims, 2 Drawing Sheets

U.S. PATENT DOCUMENTS

| | | | |
|---|---|---|---|
| 7,277,905 B2 | 10/2007 | Randal et al. | |
| 7,343,459 B2 * | 3/2008 | Prahlad et al. | 711/162 |
| 7,346,263 B2 | 3/2008 | Honda | |
| 7,346,623 B2 * | 3/2008 | Prahlad et al. | 707/102 |
| 7,437,506 B1 | 10/2008 | Kumar et al. | |
| 7,469,323 B1 | 12/2008 | Tormasov et al. | |
| 7,500,001 B2 * | 3/2009 | Tameshige et al. | 709/226 |
| 7,669,020 B1 | 2/2010 | Shah et al. | |
| 2002/0069335 A1 | 6/2002 | Flylnn, Jr. | |
| 2002/0069369 A1 | 6/2002 | Tremain | |
| 2003/0217038 A1 * | 11/2003 | Kageyama et al. | 707/999.001 |
| 2004/0225659 A1 | 11/2004 | O'Brien et al. | |
| 2005/0125513 A1 | 6/2005 | Sin-Ling Lam et al. | |
| 2005/0160243 A1 | 7/2005 | Lubbers et al. | |
| 2005/0235288 A1 * | 10/2005 | Yamakabe et al. | 718/100 |
| 2006/0059207 A1 | 3/2006 | Hirsch et al. | |
| 2006/0184937 A1 | 8/2006 | Abels et al. | |
| 2007/0174566 A1 | 7/2007 | Kaneda et al. | |
| 2007/0179999 A1 | 8/2007 | Kamei et al. | |
| 2007/0180509 A1 | 8/2007 | Swartz et al. | |
| 2007/0286575 A1 | 12/2007 | Oashi et al. | |
| 2008/0013365 A1 | 1/2008 | Yueh | |
| 2008/0215474 A1 | 9/2008 | Graham | |
| 2008/0215796 A1 | 9/2008 | Lam et al. | |
| 2008/0313371 A1 | 12/2008 | Kedem et al. | |
| 2009/0276771 A1 | 11/2009 | Nickolov et al. | |
| 2010/0275058 A1 | 10/2010 | Hashimoto et al. | |

FOREIGN PATENT DOCUMENTS

| | | |
|---|---|---|
| CN | 200780009902 | 9/2011 |
| EP | 0774715 | 5/1997 |
| JP | 2009-501704 | 7/2011 |
| WO | WO 99/09480 | 2/1999 |
| WO | WO 99/12098 | 3/1999 |
| WO | WO 02/37689 | 5/2002 |
| WO | WO 2006/017584 | 2/2006 |

OTHER PUBLICATIONS

U.S. Appl. No. 11/739,311, filed Apr. 24, 2007, Jedidiah Yueh.
U.S. Appl. No. 11/747,567, filed May 11, 2007, Scott Ogata et al.
U.S. Appl. No. 11/772,183, filed Jun. 30, 2007, Jedidiah Yueh.
Office Action, U.S. Appl. No. 11/688,203, mailed Sep. 10, 2009.
Notice of Allowance, U.S. Appl. No. 11/688,203, mailed Mar. 3, 2010.
Office Action, U.S. Appl. No. 11/968,040, mailed Sep. 17, 2009.
Final Office Action, U.S. Appl. No. 11/968,040, mailed Mar. 9, 2010.
Office Action, U.S. Appl. No. 11/739,311, mailed Sep. 21, 2009.
Final Office Action, U.S. Appl. No. 11/739,311, mailed Mar. 1, 2010.
Office Action, U.S. Appl. No. 11/747,567, mailed Sep. 30, 2009.
Final Office Action, U.S. Appl. No. 11/747,567, Feb. 24, 2010.
Office Action, U.S. Appl. No. 11/772,183, mailed Sep. 15, 2009.
Final Office Action, U.S. Appl. No. 11/772,183, mailed Feb. 24, 2010.
U.S. Appl. No. 12/762,769, filed Apr. 19, 2010, Jedidiah Yueh.
U.S. Appl. No. 11/688,203, filed Mar. 19, 2007, Jedidiah Yueh.
PCT/US07/068661, Aug. 5, 2008, ISR with Written Opinion.
PCT/US07/06440, Feb. 11, 2008, ISR with Wtitten Opinion.
CN 200780009902.x, Jun. 12, 2010, Office Action.
07758941.4, Jun. 26, 2009, Extended European Search Report.
Notice of Allowance, U.S. Appl. No. 11/688,203, mailed Mar. 24, 2010.
Office Action, U.S. Appl. No. 12/762,769, mailed Jun. 23, 2010.
Notice of Allowance, U.S. Appl. No. 11/968,040, mailed Sep. 3, 2010.
Office Action, U.S. Appl. No. 11/739,311, mailed Jul. 27, 2010.
Office Action, U.S. Appl. No. 11/747,567, mailed Sep. 8, 2010.
Office Action, U.S. Appl. No. 11/772,183, mailed Jul. 27, 2010.
Final Office Action, U.S. Appl. No. 12/762,769, mailed Oct. 26, 2010.
Final Office Action, U.S. Appl. No. 11/739,311, mailed Nov. 29, 2010.
Office Action, U.S. Appl. No. 11/739,311, mailed Mar. 16, 2011.
Final Office Action, U.S. Appl. No. 11/772,183, mailed Dec. 23, 2010.
Notice of Allowance, U.S. Appl. No. 12/762,769, mailed Apr. 15, 2011.
Sack, "SQL Server 2005 T-SQL Recipes A Problem Solution Approach", pp. 683-716, 2006.
U.S. Appl. No. 11/747,567 mailed Apr. 29, 2011 Final Office Action.
U.S. Appl. No. 11/772,183 mailed Jun. 2, 2011 Office Action.
Tooru Miyahara, the latest emulator guide by Vmware&QEMU, SoftwareDesign, book, Gijutsu-Hyohron Co. Ltd., Jul. 18, 2005, pp. 132-141.
U.S. Appl. No. 11/739,311 mailed Sep. 13, 2011 Final Office Action.

* cited by examiner

AUTOMATED PRIORITY RESTORES

CROSS-REFERENCE TO RELATED APPLICATIONS

The present application claims the benefit of U.S. Provisional Application Ser. No. 60/746,940, filed May 10, 2006 and entitled AUTOMATED PRIORITY RESTORES, which application is incorporated by reference in its entirety.

BACKGROUND OF THE INVENTION

1. Field of the Invention

The present invention relates, in general, to data storage and backup solutions for archiving data and recovering data. More particularly, embodiments of the invention relate to software, hardware, systems, and methods for facilitating automated restores of select data or files based on user-selectable criteria.

2. The Relevant Technology

The need for reliable backup and archiving of information is well known. Businesses are devoting large amounts of time and money toward information system (IS) resources that are devoted to providing backup and archive of information resident in computers and servers within their organizations that produce and rely upon digital information. Generally, backup involves using a data storage application to make a coherent copy of data. Backup has become more important as the amount of data used by enterprises has exploded. Historically, tape has been used as the medium for backing up data, i.e., providing an archival copy of data. Initially tape was a much cheaper medium than disk and other storage media, and although tape remains the medium of choice for backup, disk solutions are becoming more popular for backup due to their higher speed relative to tape. For example, a disk storage device may be used for initial backup and system mirror. Additionally, disk storage devices may be used to store snapshots, at least temporarily, that provide a consistent point-in-time copy of a data set such as a logical volume, and these snapshots may be used to make backups or archival copies that are stored to tape (e.g., stored at a remote location).

When enterprise systems fail and/or data is lost, a recovery process is initiated to restore the enterprise systems and individual machines. In order to restore data, a backup administrator or data storage administrator typically acts to perform a full restore. In a full restore, most companies restore all the files for which backups were created to the destroyed or corrupted system. Such a full restore can be very time consuming and costly, with some restore services involving a mobile vault containing backups exported to tape or disk being transported to an enterprises site or data center. In other cases, the backups are stored in formats unique to the data storage application, and the restore process involves converting the backups or archived data from this archive format to its native format. The restore of all files or data to an enterprise's systems and machines is typically performed even though most files are rarely or never accessed by the system or large portions of the system. In a disaster recovery or multiple system failure scenario, the restoring of files or data that are not important or relevant to the system or portions of the system requires a significant amount of time.

Some efforts have been made to facilitate and simplify restoring data. However, there remains a need for improved techniques of restoring systems quickly and efficiently after a disaster or system failure, and preferably such a system would be useful regardless of which data protection system or application is utilized for creating backups.

BRIEF DESCRIPTION OF THE DRAWINGS

To further clarify the above and other advantages and features of the present invention, a more particular description of the invention will be rendered by reference to specific embodiments thereof which are illustrated in the appended drawings. It is appreciated that these drawings depict only typical embodiments of the invention and are therefore not to be considered limiting of its scope. The invention will be described and explained with additional specificity and detail through the use of the accompanying drawings in which.

DETAILED DESCRIPTION OF THE PREFERRED EMBODIMENTS

Figure 1:
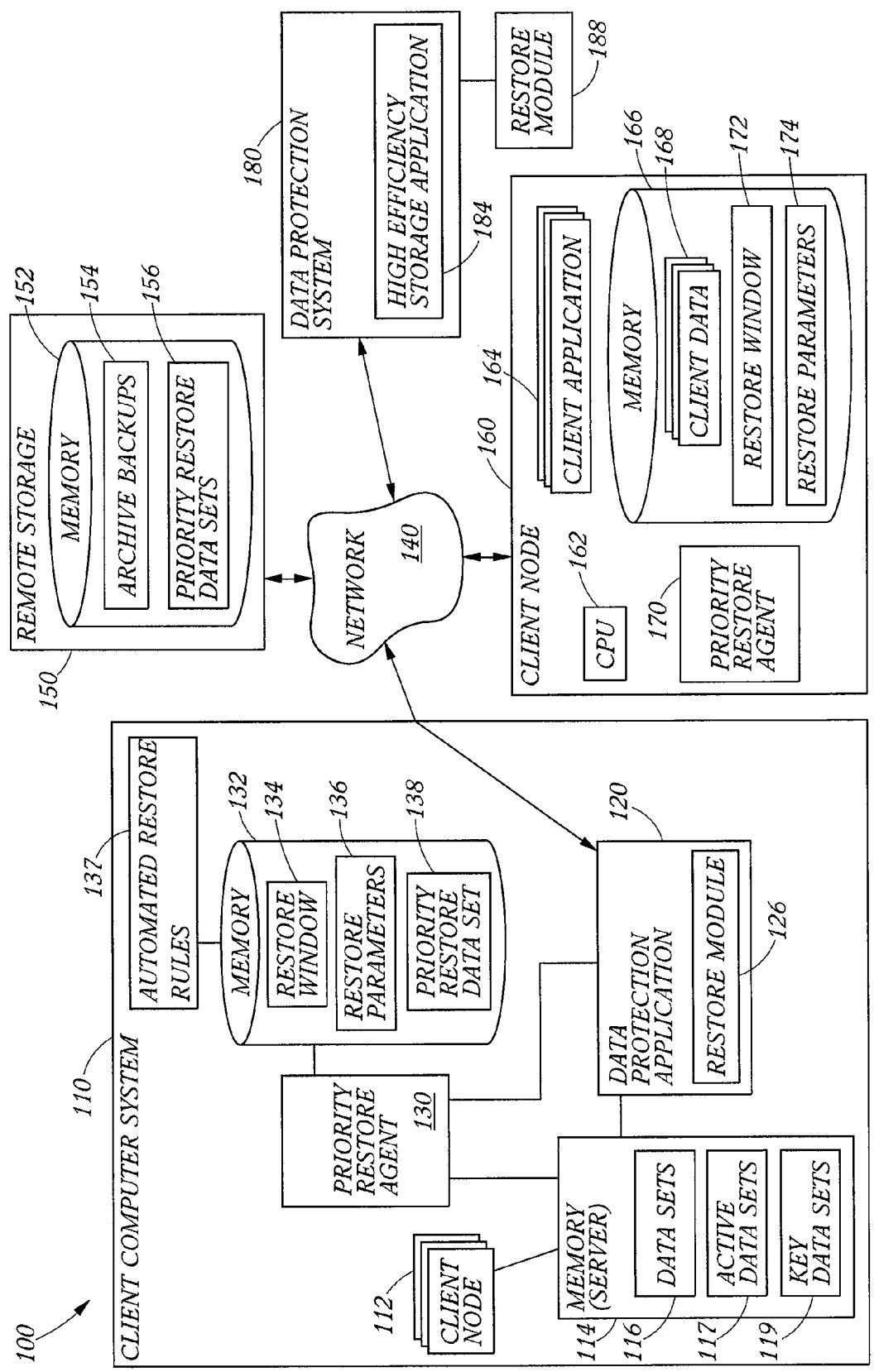
FIG. 1 illustrates a data protection system according to an embodiment of the invention including priority restore agents for generating priority restore data sets on a periodic, ongoing basis to allow automated data restore operations.

Reference will now be made to the drawings to describe various aspects of exemplary embodiments of the invention. It should be understood that the drawings are diagrammatic and schematic representations of such exemplary embodiments and, accordingly, are not limiting of the scope of the present invention, nor are the drawings necessarily drawn to scale.

The present invention is directed to methods, systems and components for generating a priority restore data set for client nodes and/or computer systems. The method may further include performing a restore of the client nodes and/or computer systems using the priority restore data set such as after a disaster or system crash. In prior data protection systems, restore processes typically involved restoring all data files to a client node or system even though many of the files or client data had not been accessed in a long period of time or simply was not relevant or useful to each client node or system. The priority restore method of the invention speeds up recovery time by reducing the amount of data that needs to be immediately restored to allow a client node or system to resume operation. In part, this is achieved by creating priority restore data sets for the client nodes or systems, and this creating may be done automatically (such as periodically upon the expiration of a refresh time period).

Briefly, the concept involves providing an agent on client systems that acts to automatically generate a priority restore data set that can then be used to restore data from or using any data protection system or application. The client agent or "priority restore agent" typically will run on a server and/or client desktops/laptops/or other workstations. The priority restore agent creates a restore data set based upon looking at or processing file system attributes and comparing these attributes with predefined restore parameters that are used to identity which files (or data sets) are to be included in the restore data sets. For example, the restore parameters may indicate that any file that has been accessed, modified, or created within a particular period of time (i.e., a priority restore window) be included in the priority restore data set. The restore window may be a policy that is created or set for groups or for all clients within a system and that is enforced locally or centrally.

Additionally, in some embodiments of the invention, the method includes identifying a set of "key" or important data sets that are identified in a set of automated restore rules (e.g., by file type, file identifier, application, or the like) and including these key data sets in the priority restore data set. In some cases, these key data sets are always restored for certain clients, groups of clients, or all clients. These key data sets are typically merged with the automatically generated data sets to create the priority restore data set(s).

To practice the invention, the computer and network devices may be any devices useful for providing the described functions, including well-known data processing and storage and communication devices and systems such as computer devices typically used as hosts in user or client computer systems with processing, memory, and input/output components, and server devices configured to maintain and then transmit digital data over a communications network. Data typically is communicated in digital format following standard communication and transfer protocols. The data storage resources, such as archive devices, are generally described as disk, optical, and tape devices that implement RAID and other storage techniques and that may use SCSI and other I/O, data transfer, and storage protocols, but the invention is not intended to be limited to the exemplary embodiments or to specific hardware and storage mechanisms as it is useful for nearly any data storage arrangement in which archives of digital data, such as data volumes, are generated and maintained and for which it is desired to obtain virtual and/or point-in-time views of subsets of such stored or archived data to leverage the backups by facilitating searching and other data storage managing tasks.

FIG. 1 illustrates a data storage (or data protection) system 100 with automated priority restore functionality according to the present invention. The system 100 is shown in simplified or example form and is intended to represent a distributed network of computer systems/devices that generate digital data that is protected with copies stored in an archive or backup file system (such as a disk, tape, or other archival solution). As shown, the system 100 includes a client computer system 110 (such as a networked enterprise system, a data center, or the like) in which a plurality of client nodes 112 such as desktops, laptops, portable computing devices, and/or other computer workstations are running one or more applications. The client nodes 112 generate data that is shown to be stored in memory 114 as data sets (such as files associated with the applications) 116. Within these data sets, there is a group of active data sets 117 (e.g., data sets that have been "touched" by a client node application within a certain time period) and a set of "key" data sets 119 (e.g., data sets that are or may be needed for operation of the client computer system 110, its nodes 112, and/or for business purposes associated with the client computer system 110).

In the client system 110 a data protection application 120 is provided that has a restore module 126 for restoring the client nodes 112 when recovery is required, e.g., when a loss of data occurs. To this end, the data protection application 120 may be nearly any data protection application or system that is useful for creating backups, snapshots, and/or archive copies of data for later recovery from disaster, system crashes, or the like. The data protection application 120 communicates over network 140 (a LAN, a WAN, the Internet, or other wired and/or wireless digital communications network) with a remote storage 150 that includes memory 152. The remote storage 150 may be a disk-based archival mechanism and/or be a tape-based system. The data protection application 120 typically generates archive backups 154 of the data sets 116, e.g., all or large portions of the data generated by the client nodes. The archive backups 154 may take many forms to practice the invention and may include complete copies of content, changes to the content, or the like and may be organized as content addressed storage or other high efficiency storage arrangements. The restore module 126 may be used to restore the client nodes 112 with the archive backups 154, e.g., restoring all data that has been archived for long term storage to the client system 110.

However, in many cases, it is much more desirable to only restore data that has been recently touched or that is important or "key" to the client nodes or the system 110 applications and business. To this end, the client computer system 110 includes a priority restore agent 130 (e.g., that may run on server 114, on a separate device as shown, or on each client node 112). Memory 132 is provided for storing a value for a restore window 134 that defines a time period for which data or files should be retained within a priority restore data set. The memory 132 also stores restore parameters 136 that define values for attributes of the data sets 116 that are to be used by the priority restore agent 130 in identifying data sets for inclusion in the priority restore data set.

For example, the data sets 116 may be part of a file system and the restore parameters may include values that indicate a file has been accessed, modified, or created, and when this information is combined with the value of the restore window, the priority restore agent 130 may access the memory and determine which data sets are active 117 based on the restore parameter 136 and the restore window 134 (i.e., which files have been accessed, modified, or created within the time period defined by the restore window). Further, automated restore rules 137 may be provided in memory 132 that define rules for further identifying key data sets 119 within the set of all data sets 116 in memory 114 that should also be included in the priority restore data set 138.

For example, files of a certain type or associated with a particular application or business process may be identified in the restore rules 137 for capture for certain clients, groups of clients, or all the clients 112. The priority restore agent 130 acts (such as periodically when a defined "refresh" period expires) to access or look at the attributes of the data sets 116 (e.g., of a file system) and determine all the data sets that are active 117 based on the window 134 and parameters 136 (e.g., which files have been recently touched within the last month or some other useful time period) and which are key data sets 119, and these data sets are combined to create a priority restore data set 138.

A copy of the restore data set 138 is shown in local memory 132 but to protect against disaster, a copy 156 may also stored in remote storage 150 (but in some embodiments only one of these copies is provided or additional copies are stored). A request for restore may be received by the data protection application 120 (or remote data protection system 180), and a restore module 126 (or module 188) may restore one or more of the client nodes 112 using the priority restore data set 138 or 156 rather than the full archive backups 154.

Also as shown, the system 100 may include a standalone or remote client node 160 that is linked to network 140 and includes a CPU 162 running applications 164. The applications 164 use and/or create client data 168 that is stored in local memory 166. A remote data protection system 180 linked to the network 140 runs a high efficiency storage application 184 with restore module 188 to create archive backups 154 of the client data 168. In this manner, the client node 160 can be restored with all (or large portions) of the client data 168. As discussed above, there may be situations where a more speedy recovery is desirable but that still recovers data needed by an operator of the client node 160.

Often, such a quick and effective restore is achievable for the client node 160 by loading a priority restore agent 170 on the client node 160. The restore agent 170 functions to retrieve a restore window value 172 and restore parameters 174 from memory 166 (or from another system such as data protection system 180 or another central management system (not shown)), and in some cases, rules identifying key or important files that should always be restored for the client 160 regardless of when they were last touched or used by the applications 164. The restore agent 170 then accesses the client data or its file system to determine which portions of the client data 168 should be captured in a priority restore data set 156 that is stored remote from client node 160. The priority restore data set 156 for the client node 160 typically will include all files that have been created, accessed, or modified within the restore window 172 and may also include "key" data or files useful for operating the client node and/or that are deemed critical by or for the operator of the client node 160.

The values for the restore window, the restore parameters, and the automated restore rules may be default values or may be user tunable and/or selectable. For example, some clients may desire the restore window to be relatively short, such as one week to one month, while other clients may desire a longer time period to be used, such as one month to three months or longer. Also, the definition of data or a file that has been touched or that is active may vary among clients and can be set to suit the parameters available for inspection in the data sets 116, 168, e.g., any definition of active can be used as long as the priority restore agent 130, 170 can determine which portion of the client data meets the definition. The client or another administrator may also provide input for defining which data or files should be identified as key data sets 119 and always included in the priority restore data sets 138, 156.

When the client node 160 needs to be restored, the high efficiency storage application 184 may received a restore request or otherwise be caused to use its restore module 188 to restore the client node 160 using its corresponding priority restore data set 156 rather than all archived data 154 for the client node 160.

Figure 2:
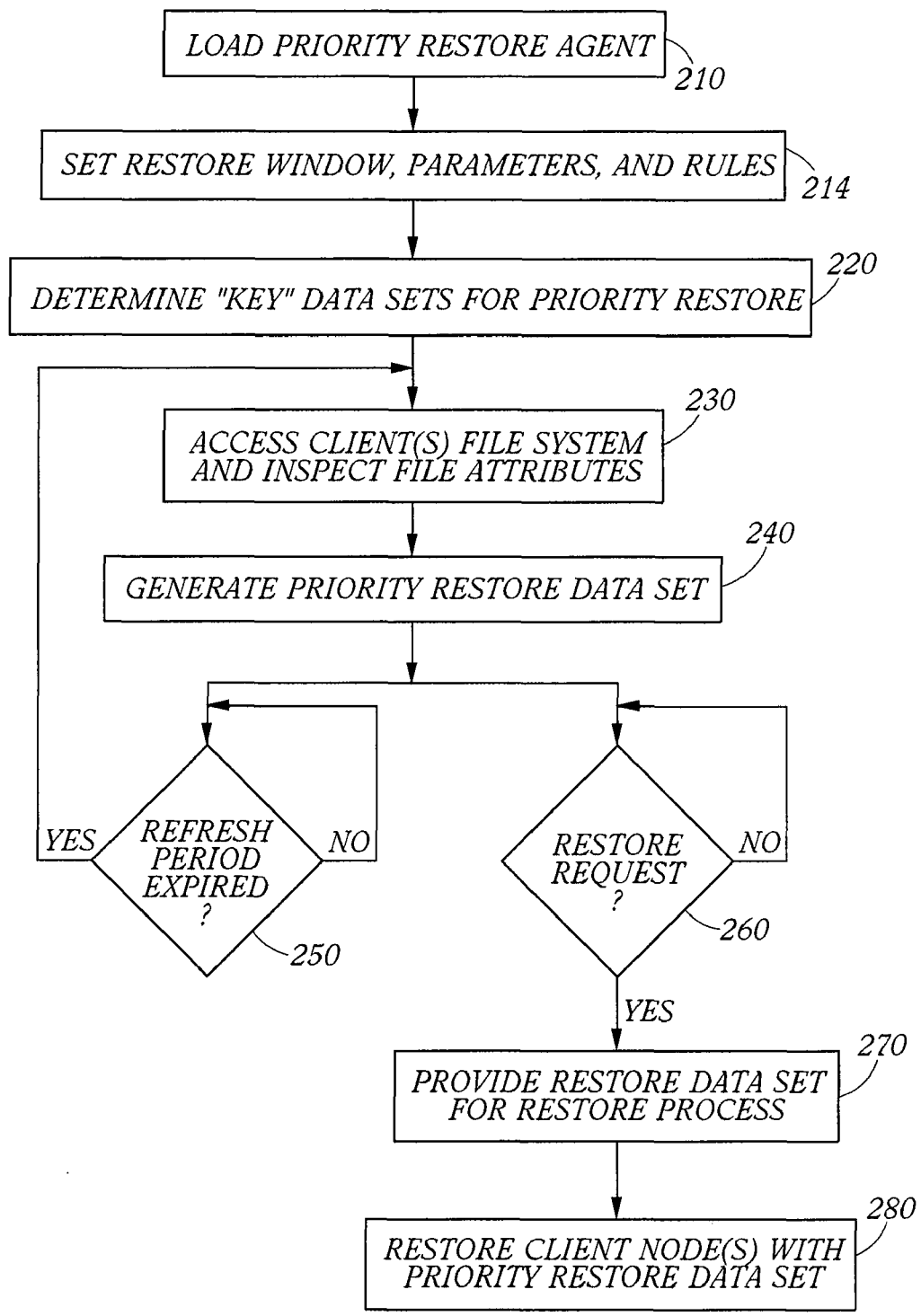
FIG. 2 illustrates an exemplary priority restore process according to an embodiment of the present invention as may be implemented by operation of the data protection system of FIG. 1.

FIG. 2 illustrates a priority restore method 200 according to one embodiment of the invention and will be discussed with reference to the components of FIG. 1 (although the method 200 may readily be implemented in other data protection systems and architectures). The method 200 starts with loading 210 the priority restore agent 130, 170 on one or more client devices or systems (e.g., the agent sits on a server, a desktop, or other computer used by a client user/operator). This may include initiating communication links/APIs with the memory 114, 132, 166 and with data protection applications 120, 180 as well as remote storage 150. The method 200 continues with setting 214 the values of parameters/variables that are used by the restore agent 130, 170 in generating a priority restore data set. This may include defining the priority restore window, setting how a file or set of data is determined to be "active", and which data sets or files are to be considered "key" and for which client devices.

The priority restore agent 130, 170 accesses a data set or file system to identify 220 a set of key data sets or files based on the automated restore rules (e.g., all files of a particular type or the like). The priority restore agent 130, 170 accesses 230 the data set or file system 116, 168 and determines/identifies from the file system or data set attributes and the values of the restore parameters 136, 178 which of the data sets or files are active (e.g., active data sets 117). Continuing, the priority restore agent 130, 170 generates 240 a priority restore data set 138, 156 by combining the data sets defined in steps 220 and 230. Note that such restore data sets 138, 156 may be generated on a client node or client system basis or for groups of client nodes or an entire enterprise. In other words, each client node may be restored independently with differing restore data from a unique or a shared priority restore data set.

The method 200 continues with a determination 250 of whether a "refresh" period has expired and if so, a new priority restore data set is generated by accessing the client file system or data sets again. For example, a priority restore data set may be generated periodically such as hourly or some other time period selected to provide adequate data protection and restore functionality while not unduly increasing the processing overhead associated with the priority restore agent being resident on a client system.

The method 200 continues with a restore request (or some other initiator for a restore process) for one or more client devices/systems. At 270 and 280, a data protection application 120, 180 may restore the client nodes or systems 112, 160 associated with the restore request using the priority restore data set 138, 156 associated with particular client nodes or systems 112, 160. The restore request in some cases may indicate that a subset of the priority restore data set 138, 156 be used to restore a particular client. For example, a restore request may indicate that all files of a particular type should be restored initially. Alternatively, an operator of a data protection or backup application 120, 184 may use its restore module 126, 188 to select data sets or files within the priority restore data set 138, 156 for restoring onto one or more of the client nodes 112, 160.

Embodiments included general-purpose and/or special-purpose devices or systems that include both hardware and/or software components.

Embodiments may also include physical computer-readable media and/or intangible computer-readable media for carrying or having computer-executable instructions, data structures, and/or data signals stored thereon. Such physical computer-readable media and/or intangible computer-readable media can be any available media that can be accessed by a general purpose or special purpose computer. By way of example, and not limitation, such physical computer-readable media can include RAM, ROM, EEPROM, CD-ROM or other optical disk storage, magnetic disk storage or other magnetic storage devices, other semiconductor storage media, or any other physical medium which can be used to store desired data in the form of computer-executable instructions, data structures and/or data signals, and which can be accessed by a general purpose or special purpose computer. Within a general purpose or special purpose computer, intangible computer-readable media can include electromagnetic means for conveying a data signal from one part of the computer to another, such as through circuitry residing in the computer.

When information is transferred or provided over a network or another communications connection (either hardwired, wireless, or a combination of hardwired or wireless) to a computer, hardwired devices for sending and receiving computer-executable instructions, data structures, and/or data signals (e.g., wires, cables, optical fibers, electronic circuitry, chemical, and the like) should properly be viewed as physical computer-readable mediums while wireless carriers or wireless mediums for sending and/or receiving computer-executable instructions, data structures, and/or data signals (e.g., radio communications, satellite communications, infrared communications, and the like) should properly be viewed as intangible computer-readable mediums. Combinations of the above should also be included within the scope of computer-readable media.

Computer-executable instructions include, for example, instructions, data, and/or data signals which cause a general purpose computer, special purpose computer, or special purpose processing device to perform a certain function or group of functions. Although not required, aspects of the invention have been described herein in the general context of computer-executable instructions, such as program modules, being executed by computers, in network environments and/or non-network environments. Generally, program modules include routines, programs, objects, components, and content structures that perform particular tasks or implement particular abstract content types. Computer-executable instructions, associated content structures, and program modules represent examples of program code for executing aspects of the methods disclosed herein.

Embodiments may also include computer program products for use in a system. The computer program product may comprise a physical computer-readable medium having computer readable program code stored thereon, the computer readable program code comprising computer executable instructions that, when executed by a processor, cause the system to perform the methods disclosed herein.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method for restoring data sets on a client computer system, comprising:
    providing a priority restore agent on a client system;
    setting parameters used in generating a priority restore data set, the parameters including a priority restore window, wherein the priority restore agent refreshes the priority restore data set periodically or according to another basis;
    operating the priority restore agent to access file system attributes for client system data associated with the client system;
    comparing the file system attributes with the parameters to identify data to be included in the priority restore data set;
    generating the priority restore data set for the client system, wherein the priority restore data set includes portions of the client system data that have been accessed, modified, or created within the priority restore window;
    storing the priority restore data set at a location remote to the client system; and
    performing a restore process on the client system, wherein the restore process comprises restoring data in the priority restore data set onto the client system to allow the client system to resume operation, wherein the data in the priority restore data set allows the client system to resume operation.

2. The method of claim 1, wherein the priority restore window includes a predetermined time period and wherein the generating of the priority restore data set comprises identifying the portions of the client system data that have been accessed, modified, or created within the predetermined time period.

3. The method of claim 2, further comprising identifying a portion of the client system data for inclusion in all priority restore data sets and wherein the generating of the priority restore data set includes merging the portion of the client system data for inclusion in all priority restore data sets and the portions of the client system data that have been accessed, modified, or created within the predetermined time period.

4. The method of claim 3, further comprising receiving user input defining the predetermined time period and an attribute for performing the identifying of the portion of the data for inclusion in all priority restore data sets.

5. The method of claim 3, wherein the client system data comprises a plurality of files and the portion of the client system data for inclusion in all priority restore data sets and the portions of the client system data that have been accessed, modified, or created within the predetermined time period comprise files of client data.

6. In a client computer system wherein client system data is stored, a method for using restore data sets to perform a priority restore of the client system data, the method comprising:
    accessing memory to identify a predetermined time period for which data should be retained and to identify one or more attributes that are used in identifying data sets;
    generating a priority restore data set based on the predetermined time period and on the one or more attributes by comparing the one or more attributes with the predetermined time period to identify the priority restore data set from the client system data, wherein the priority restore data set identifies a portion of the client system data to be restored and wherein the priority restore data set includes the portion of the client system data;
    storing the priority restore data set in a memory location; and
    performing a restore process on the client system, wherein the restore process comprises restoring data in the priority restore data set onto the client system to allow the client system to resume operation using the data identified in the priority data set while restoring the client system data not included in the priority restore data set, wherein the data in the priority restore data set allows the client system to resume operation.

7. The method of claim 6, wherein the one or more attributes comprise one or more of:
    the date and time the client system data was last accessed;
    the date and time the client system data was last modified; and
    the date and time the client system data was created.

8. The method of claim 6, further comprising accessing memory to identify a portion of the client system data for inclusion in the priority restore data set and wherein generating the priority restore data set is additionally based on the identified portion.

9. The method of claim 6, wherein the memory location comprises one or more of a memory location remote to the client system; and a memory location within the client system, wherein the method further comprises.

10. The method of claim 6, further comprising:
    determining that a refresh period has expired; and
    in response to the expiration of the refresh period, re-accessing memory to identify the predetermined time period and the one or more attributes;
    re-accessing file system attributes for the client system data;
    generating a second priority restore data set based on the predetermined time period, the one or more attributes and the file system attributes; and storing the second priority restore data set in a memory location, wherein the restore process uses the second priority restore data set in restoring data to the client system.

11. The method of claim 10, wherein the second priority restore data set generated after a refresh period expires differs from the priority restore data set generated before the refresh period expires.

12. The method of claim 6, restoring a portion of the client data from archived client data using the priority restore data set.

13. The method of claim 12, wherein further comprising restoring data to multiple clients based on multiple priority restore data sets received from the multiple clients.

14. The method of claim 6, wherein generating a priority restore data set further comprises one or more of:
   determining which data sets are active based on restore parameters and the predetermined time period;
   identifying data sets for inclusion in the priority restore data set based on one or more of the predetermined time period, or attributes of data that are deemed key by default or by user input.

15. In a data storage system comprising a client computer system and a remote memory location, wherein client system data is stored in a local memory location of the client computer system and archive backup data is stored in the remote memory location, a method of restoring the client computer system using one or more priority data sets, the method comprising:
   receiving a restore request for the client computer system;
   accessing a priority restore data set in a memory location, the priority restore data set generated by a priority restore agent of the data storage system using at least on file system attributes for the client system data that are deemed key either by default or by a user to identify data from the client system data to be included in the priority restore data set, wherein the priority restore data set identifies a portion of the archived backup data to be restored to the client computer system, wherein the priority restore data set is refreshed periodically or according to another basis; and
   performing a restore process on the client system, wherein the restore process comprises restoring data identified in the priority restore data set onto the client system to allow the client system to resume operation using the data identified in the priority restore data set while restoring the client system data, wherein the data identified in the priority restore data set allows the client system to resume operation.

16. The method of claim 15, wherein the priority restore data set is generated by identifying portions of the client system data that have been accessed, modified, or created within a predetermined time period.

17. The method of claim 16, further comprising one of either refreshing the priority restore data set after the predetermined time period expires or generating a second priority restore data set and storing the priority restore data set locally and/or remotely.

18. The method of claim 15, further comprising generating the priority restore data set, the priority restore data set identifying a portion of the client data based on at least one of the predetermined time period or attributes of the client data, the attributes including rules that identify data included in the priority restore set that do not depend on when data was accessed or used.

19. The method of claim 15, wherein the priority restore data set is independent of any data protection application used to generate archive data backups and can be used to restore the client data identified therein.

* * * * *